(12) United States Patent
Hanslmeier

(10) Patent No.: US 11,324,370 B2
(45) Date of Patent: May 10, 2022

(54) VACUUM CLEANER HOSE

(71) Applicant: Hilti Aktiengesellschaft, Schaan (LI)

(72) Inventor: Xaver Hanslmeier, Mauerstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/975,143

(22) PCT Filed: Mar. 14, 2019

(86) PCT No.: PCT/EP2019/056384
§ 371 (c)(1),
(2) Date: Aug. 24, 2020

(87) PCT Pub. No.: WO2019/179867
PCT Pub. Date: Sep. 26, 2019

(65) Prior Publication Data
US 2021/0113043 A1 Apr. 22, 2021

(30) Foreign Application Priority Data
Mar. 22, 2018 (EP) .................................... 18163235

(51) Int. Cl.
*A47L 9/24* (2006.01)
*A47L 7/00* (2006.01)
*F16L 11/12* (2006.01)
*F16L 11/04* (2006.01)

(52) U.S. Cl.
CPC ............. *A47L 9/248* (2013.01); *A47L 7/0004* (2013.01); *A47L 7/0014* (2013.01); *F16L 11/12* (2013.01); *F16L 11/121* (2013.01); *F16L 11/04* (2013.01)

(58) Field of Classification Search
CPC ..... A47L 9/16; A47L 9/24; B03C 3/15; B03C 3/36; B01D 45/16
USPC .............................. 138/37, 39; 366/337–339
See application file for complete search history.

(56) References Cited

U.S. PATENT DOCUMENTS

| | | | | |
|---|---|---|---|---|
| 3,313,577 A | * | 4/1967 | Wolfe | F15D 1/065 406/46 |
| 3,719,207 A | * | 3/1973 | Takeda | F16L 55/00 366/181.5 |
| 3,734,140 A | * | 5/1973 | Nakamura | B21C 37/207 138/177 |
| T103,901 I4 | * | 2/1984 | Lupke et al. | F16L 25/0036 138/122 |

(Continued)

FOREIGN PATENT DOCUMENTS

| | | |
|---|---|---|
| CN | 203214207 | 9/2013 |
| DE | 102011083319 | 3/2013 |

(Continued)

OTHER PUBLICATIONS

International Search Report of PCT/EP2019/056384, dated Jun. 17, 2019.

*Primary Examiner* — Patrick F Brinson
(74) *Attorney, Agent, or Firm* — Davidson, Davidson & Kappel, LLC

(57) ABSTRACT

Vacuum cleaner hose for connecting to a wet and dry vacuum cleaner, wherein the vacuum cleaner hose has an inner lumen extending in the longitudinal direction, wherein a flow guiding geometry is formed within the lumen or adjoining the lumen, by which a suction flow occurring during the operation of the wet and dry vacuum cleaner can be influenced.

13 Claims, 8 Drawing Sheets

(56) References Cited

U.S. PATENT DOCUMENTS

| | | | | |
|---|---|---|---|---|
| 4,541,976 | A * | 9/1985 | Batigne | B28B 21/98 264/69 |
| 5,632,962 | A * | 5/1997 | Baker | B01J 19/006 422/211 |
| 7,721,767 | B2 * | 5/2010 | Houston | A61F 2/06 138/39 |
| 2004/0134557 | A1 * | 7/2004 | Cymbalisty | C10G 1/047 138/177 |
| 2006/0005892 | A1 * | 1/2006 | Kuo | F15D 1/02 138/37 |
| 2006/0051448 | A1 * | 3/2006 | Schryver | B01F 5/0655 425/381 |

FOREIGN PATENT DOCUMENTS

| | | |
|---|---|---|
| EP | 2087827 | 8/2009 |
| WO | WO9727414 | 7/1997 |

* cited by examiner

VACUUM CLEANER HOSE

The present invention relates to a vacuum cleaner hose for connecting to a wet and dry vacuum cleaner, wherein the vacuum cleaner hose has an inner lumen extending in the longitudinal direction.

BACKGROUND

Vacuum cleaner hoses of the type stated at the outset are known in principle from the prior art and are used to extract dirt particles during cutoff grinding, for example. In this case, for example, a cutoff grinder is connected via the vacuum cleaner hose to a wet and dry vacuum cleaner.

SUMMARY OF THE INVENTION

It is an object of the present invention to provide a vacuum cleaner hose which promotes an improved suction behavior.

The present invention provides a flow guiding geometry is formed within the lumen or adjoining the lumen, by means of which a suction flow occurring during the operation of the wet and dry vacuum cleaner can be influenced.

The invention incorporates the insight that a vacuum cleaner hose, particularly a spiral hose, of a wet and dry vacuum cleaner causes very high pressure and flow losses owing to its geometry. These losses are primarily caused by a high wall friction and severe edge swirling transversely to the hose axis. These losses impair the overall efficiency of the wet and dry vacuum cleaner considerably.

By virtue of the flow guiding geometry formed within the lumen according to the invention, it is advantageously possible to achieve a longitudinal vortex form and thus centering of the suction flow, which promotes media transfer with relatively low losses overall.

In a preferred embodiment, the flow guiding geometry extends inward in the radial direction.

The flow guiding geometry can extend or be distributed over the total length of the vacuum cleaner hose. The flow guiding geometry preferably extends or is distributed in the form of a spiral over the total length of the vacuum cleaner hose. Thus, an advantageous longitudinal vortex can be maintained over the total length of the hose.

In another preferred embodiment, the flow guiding geometry has a plurality of discrete profiled bodies. As an alternative or in addition, the flow guiding geometry can have a continuous web or channel.

It has proven advantageous if the flow guiding geometry has a pyramidal or barrel-shaped cross section.

As a particular preference, the flow guiding geometry is welded to an inner surface of the vacuum cleaner hose.

In another preferred embodiment, the flow guiding geometry is formed by an inwardly arched portion or indentation of the hose outside oriented into the hose interior.

The vacuum cleaner hose is preferably composed of plastic. The vacuum cleaner hose can have a substantially constant outside diameter. In this context, "substantially" is intended to mean a constant outside diameter without taking into account any external ridging of the spiral hose.

In one particularly preferred embodiment, the vacuum cleaner hose is designed as a spiral hose. Within the vacuum cleaner hose, an inner hose or an inner tube can be formed which extends over the total length of the vacuum cleaner hose and on the inner surface of which the flow guiding geometry is formed.

The present invention also provides a suction system having a wet and dry vacuum cleaner and a vacuum cleaner hose of the type described above.

BRIEF DESCRIPTION OF THE DRAWINGS

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form expedient further combinations.

In the figures, identical components and components of identical type are designated by the same reference signs.

In the Figures:

FIG. 1 shows a first preferred exemplary embodiment in cross section;

FIG. 2 shows schematically a side view of an embodiment similar to the exemplary embodiment of FIG. 1;

FIG. 3 shows a second preferred exemplary embodiment in cross section;

FIG. 4 shows schematically a side view of an embodiment similar to the exemplary embodiment of FIG. 3;

FIG. 5 shows a third preferred exemplary embodiment in cross section;

FIG. 6 shows schematically a side view of an embodiment similar to the exemplary embodiment of FIG. 5;

FIG. 7 shows a fourth preferred exemplary embodiment in cross section; and

FIG. 8 shows a side view of the exemplary embodiment of FIG. 7.

DETAILED DESCRIPTION

Figure 1:
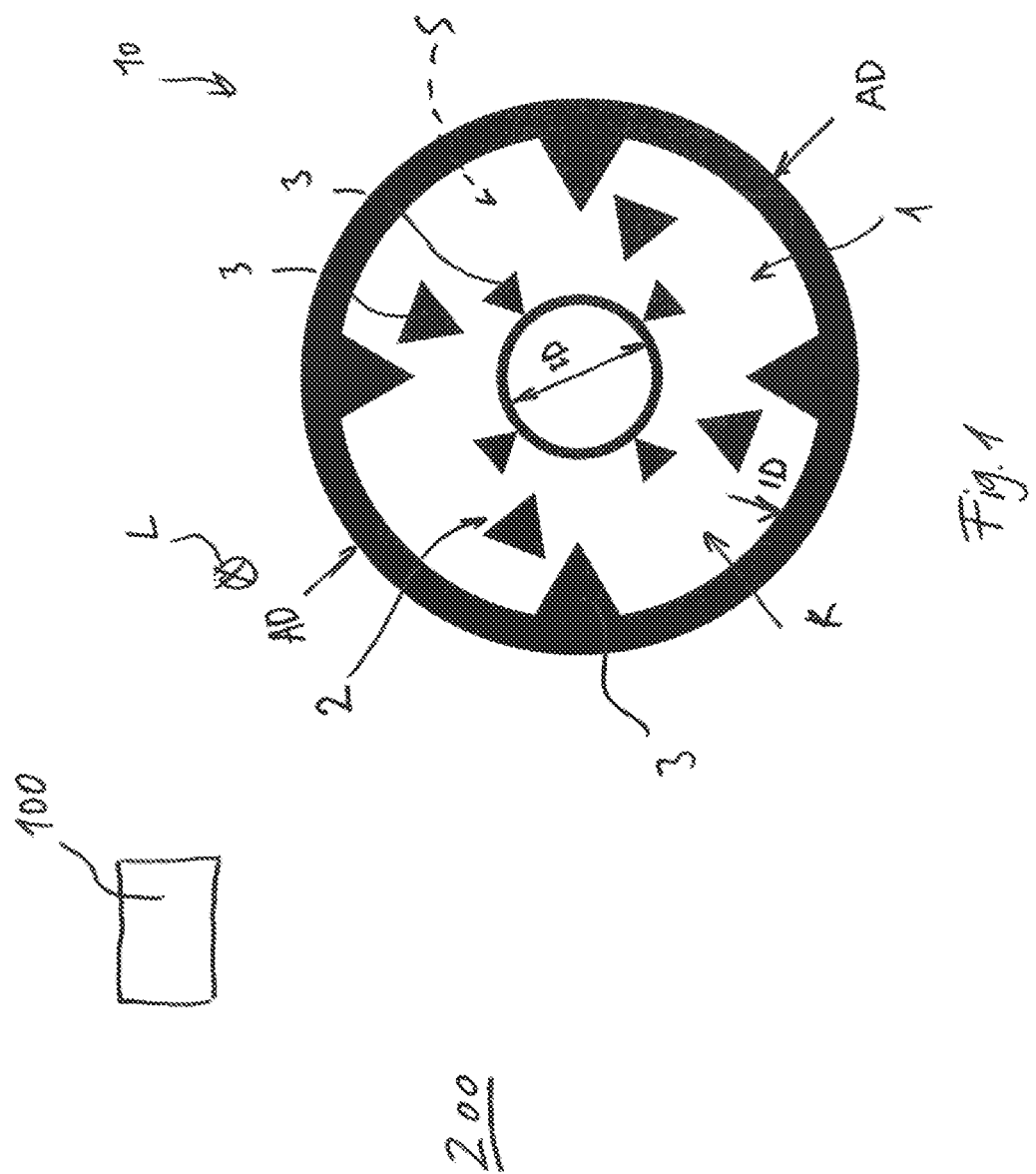

FIG. 1 shows a vacuum cleaner connection 10 for connecting to a wet and dry vacuum cleaner 100. The wet and dry vacuum cleaner 100 and the vacuum cleaner hose 10 can form a suction system 200.

The vacuum cleaner hose 10 has an inner lumen 1 extending in the longitudinal direction L. In FIG. 1, the longitudinal direction L extends into the plane of the image.

According to the invention, a flow guiding geometry 2 is formed within the lumen 1, by means of which a suction flow S occurring during the operation of the wet and dry vacuum cleaner 100 can be influenced.

Figure 2:
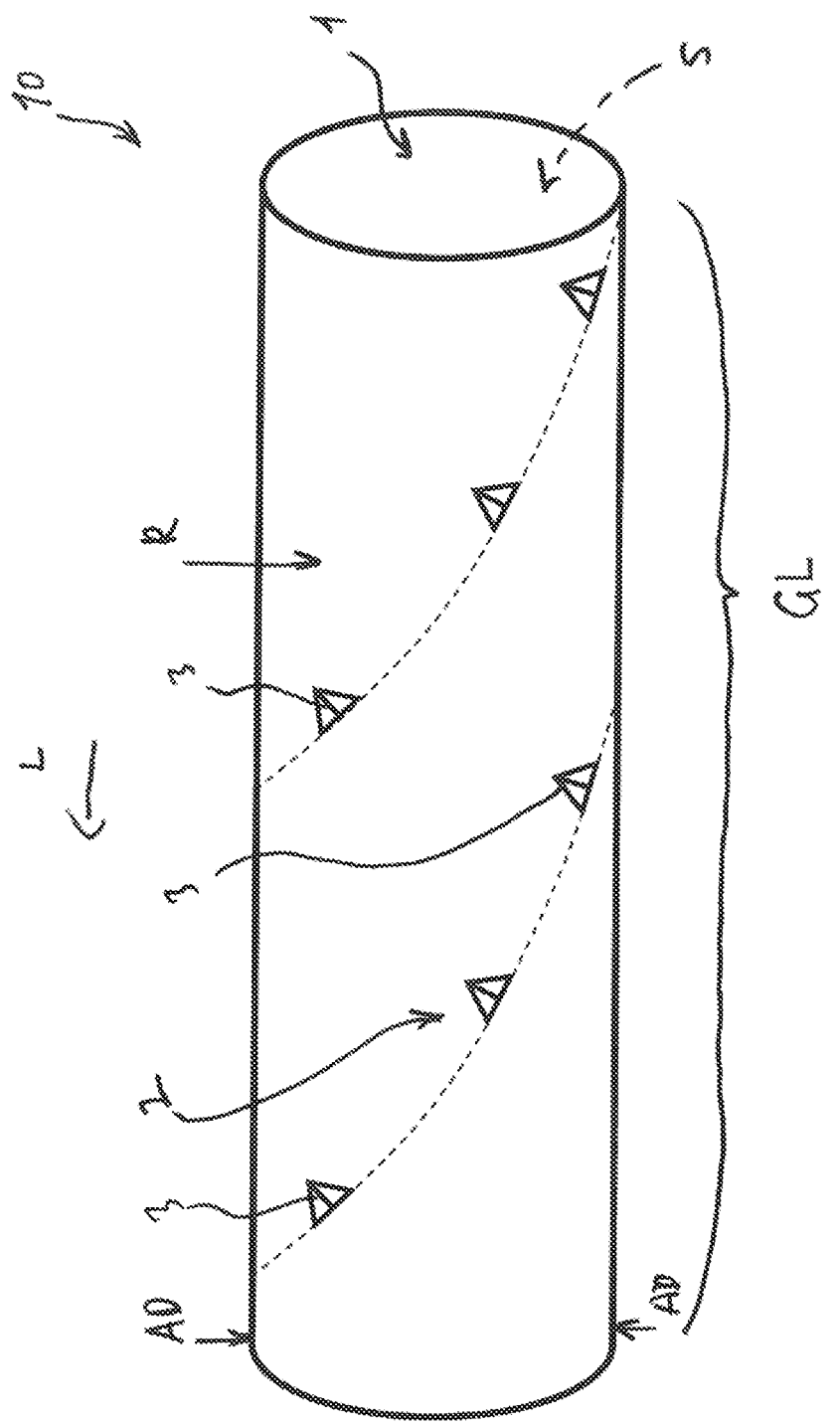

The vacuum cleaner hose 10 has a constant outside diameter AD over its total length GL (cf. FIG. 2).

FIG. 1 shows a perspective view into the hose interior, wherein the inside diameter ID tapers even though, apart from the flow guiding geometry 2, it is constant over the entire length of the vacuum cleaner hose 10.

As can likewise be seen from FIG. 1, the flow guiding geometry 2 is formed by a plurality of discrete profiled bodies 3, which have a pyramidal cross section in the exemplary embodiment under consideration. The flow guiding geometry 2, to be more precise the respective points of the discrete profiled bodies 3 of pyramidal design, extends/extend inward in the radial direction R.

In this case, the discrete profiled bodies 3 are welded to an inner surface of the vacuum cleaner hose 10. By way of example, the vacuum cleaner hose 10, together with the discrete profiled bodies 3 forming the flow guiding geometry 2, are composed of plastic.

When FIGS. 1 and 2 are viewed together, it becomes clear that the flow guiding geometry 2 extends in the form of a spiral over the total length GL of the vacuum cleaner hose.

Since, in this preferred exemplary embodiment, the flow guiding geometry 2 is formed by a plurality of discrete profiled bodies 3, the flow guiding geometry is accordingly distributed in the form of a spiral over the total length GL of the vacuum cleaner hose. In this way, an advantageous longitudinal vortex form can be obtained over the total length GL of the vacuum cleaner hose 10.

As already mentioned, the vacuum cleaner hose 10 has a constant outside diameter AD over its total length GL. The vacuum cleaner hose 10 is preferably designed as a spiral hose, although this is not illustrated in FIG. 2.

Figure 3:
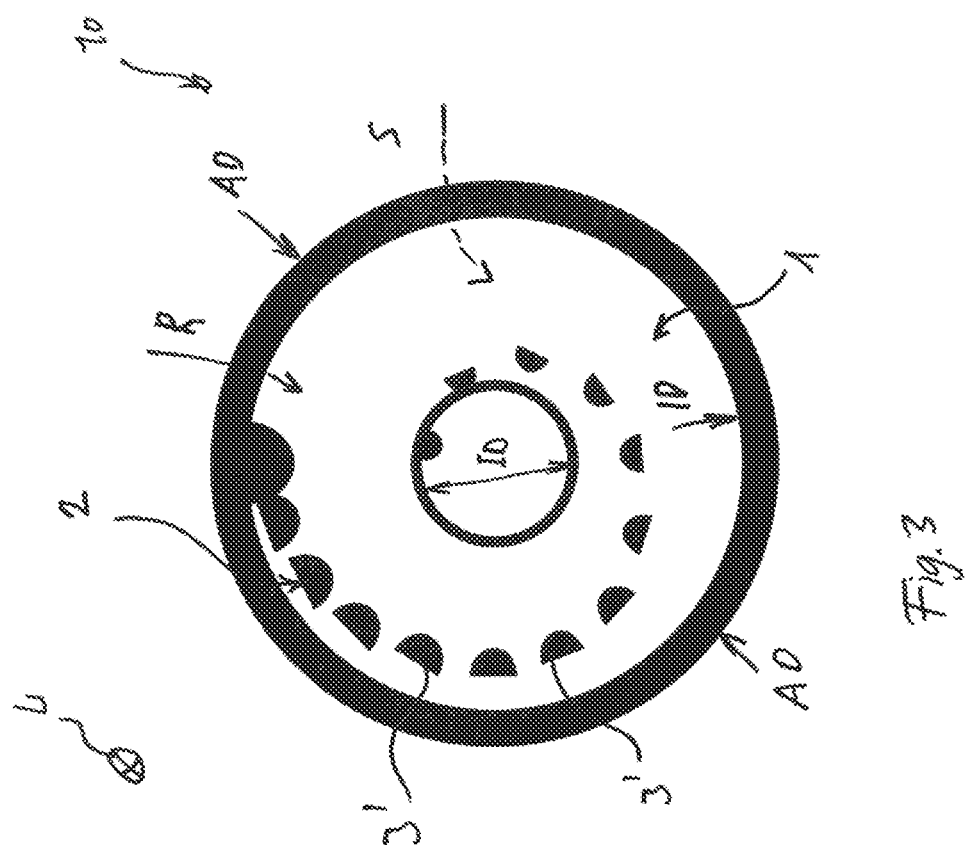

FIG. 3 shows another preferred exemplary embodiment of the vacuum cleaner hose 10 according to the invention. In contrast to the exemplary embodiments in FIGS. 1 and 2, the plurality of discrete profiled bodies 3' is provided with a barrel-shaped cross section.

Figure 4:
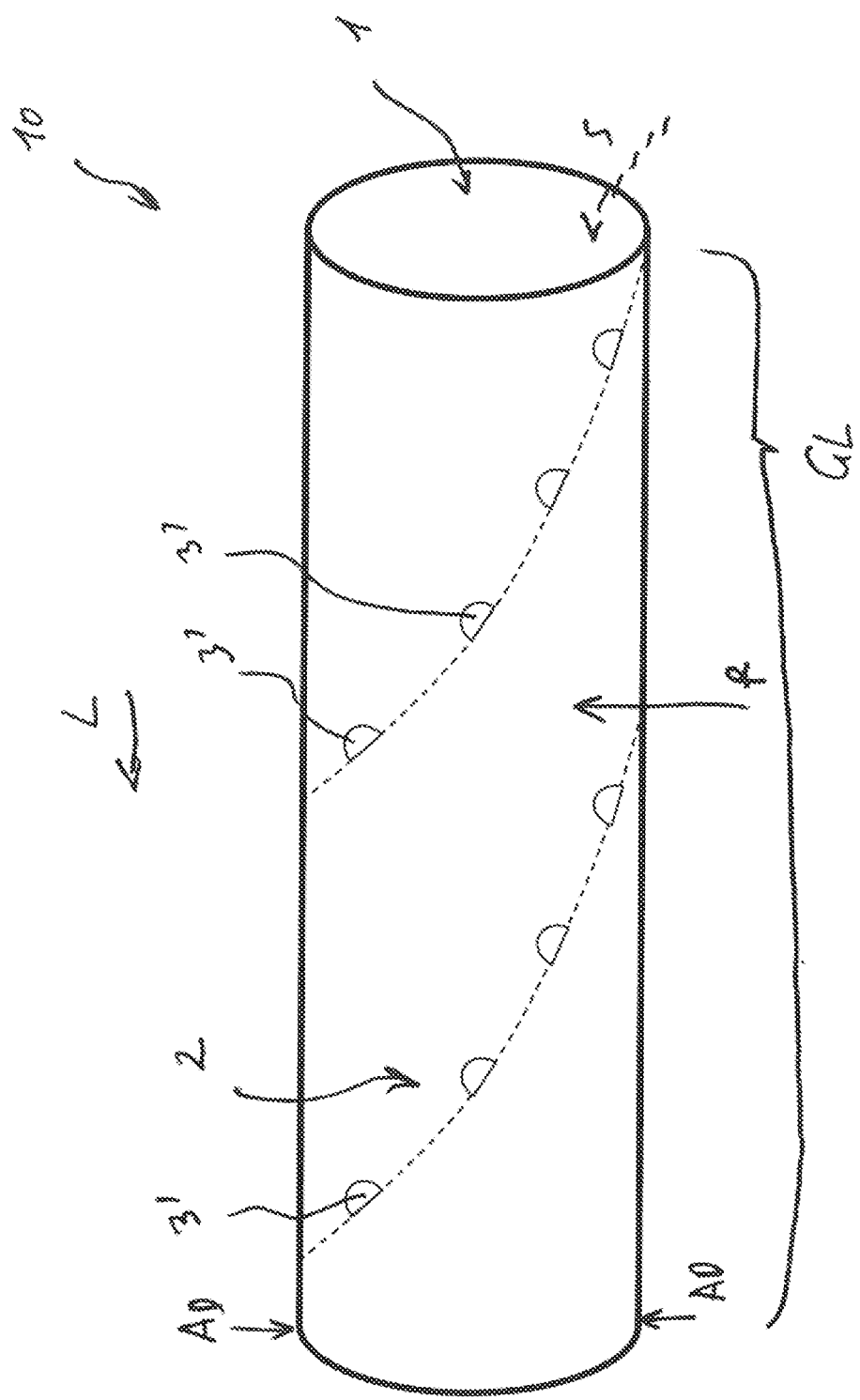

When FIGS. 3 and 4 are viewed together, it is readily apparent that the flow guiding geometry 2 is distributed in the form of a spiral over the total length GL of the vacuum cleaner hose 10.

Figure 5:
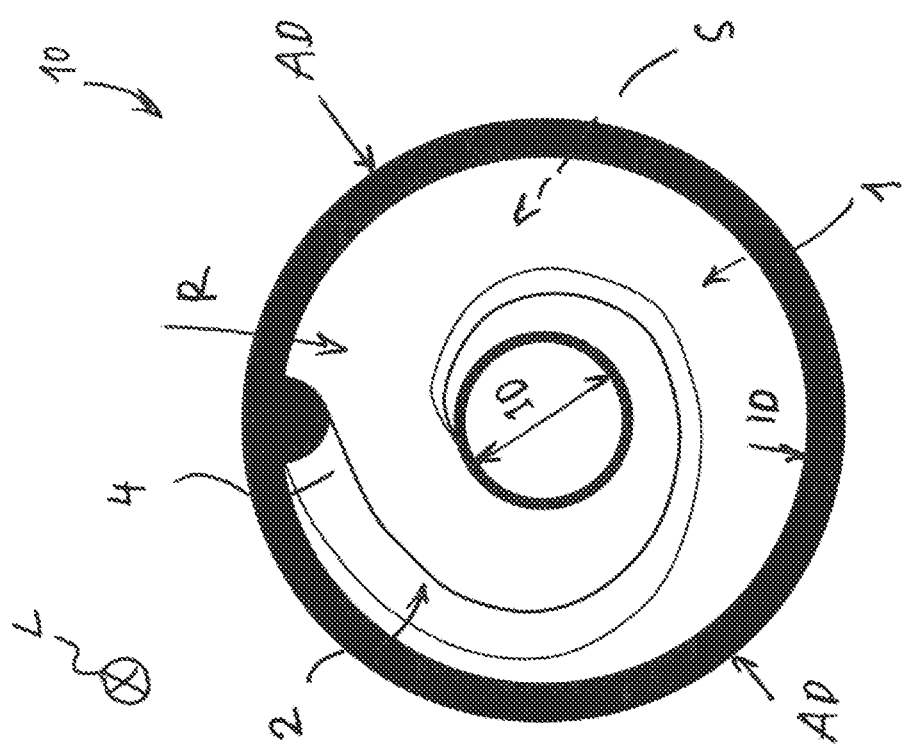
Figure 6:
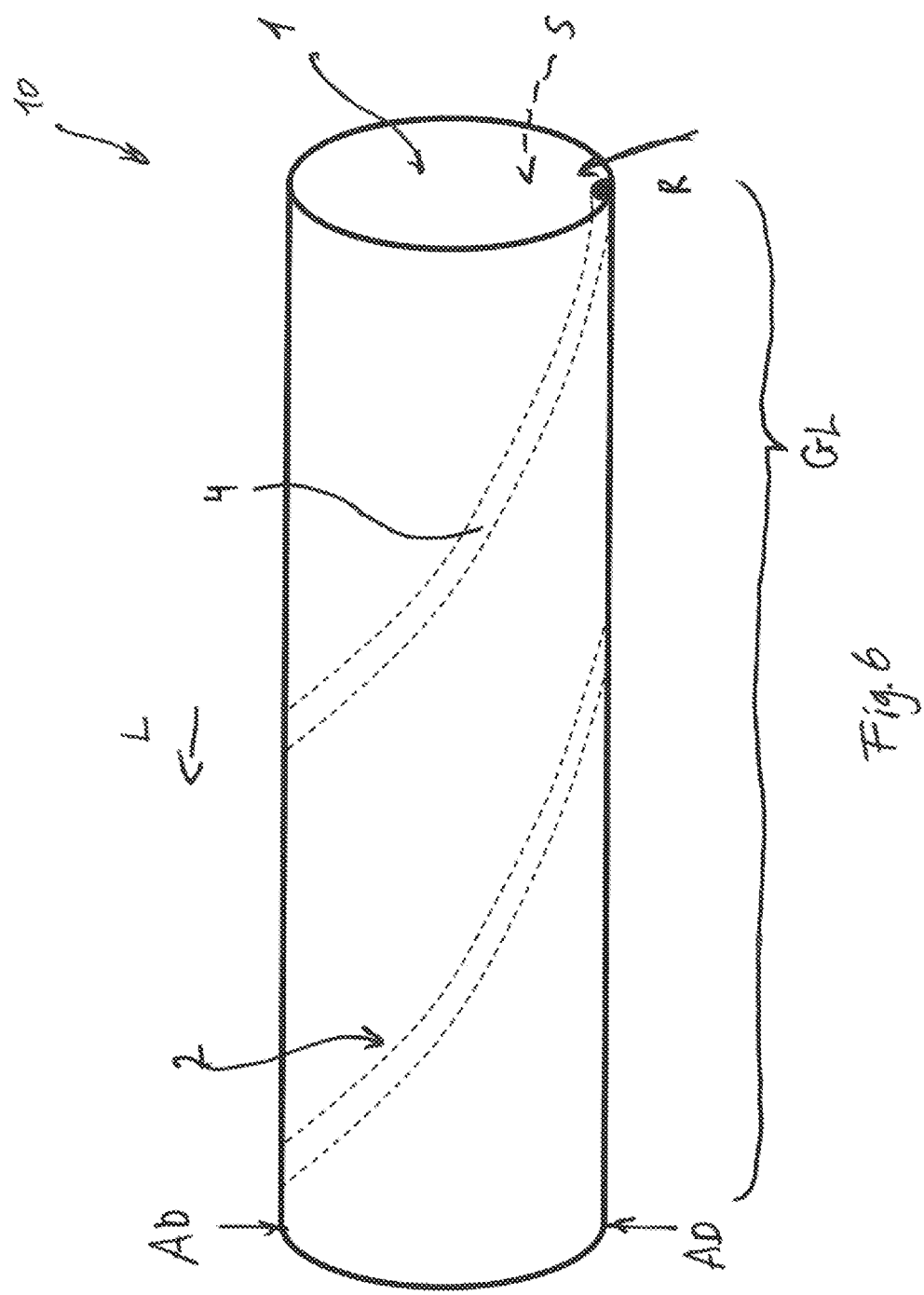

Third exemplary embodiments of a vacuum cleaner hose 10 according to the invention are illustrated in FIGS. 5 and 6. It is readily apparent that the flow guiding geometry 2 extends in the form of a spiral over the total length GL of the vacuum cleaner hose 10, wherein the flow guiding geometry 2 has a continuous web 4. For its part, the continuous web 4 has a barrel-shaped cross section.

It is readily apparent in FIG. 5 that the flow guiding geometry 2, here in the form of a continuous web 4 with a barrel-shaped cross section, extends inward in the radial direction R.

Figure 7:
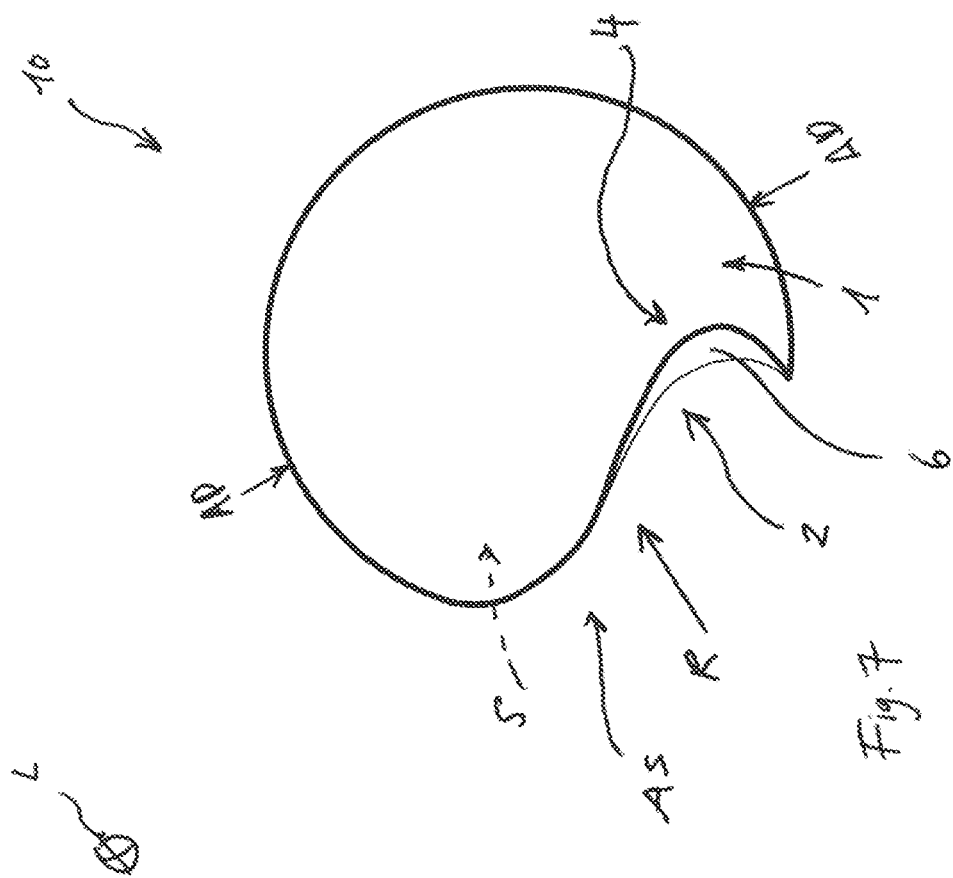
Figure 8:
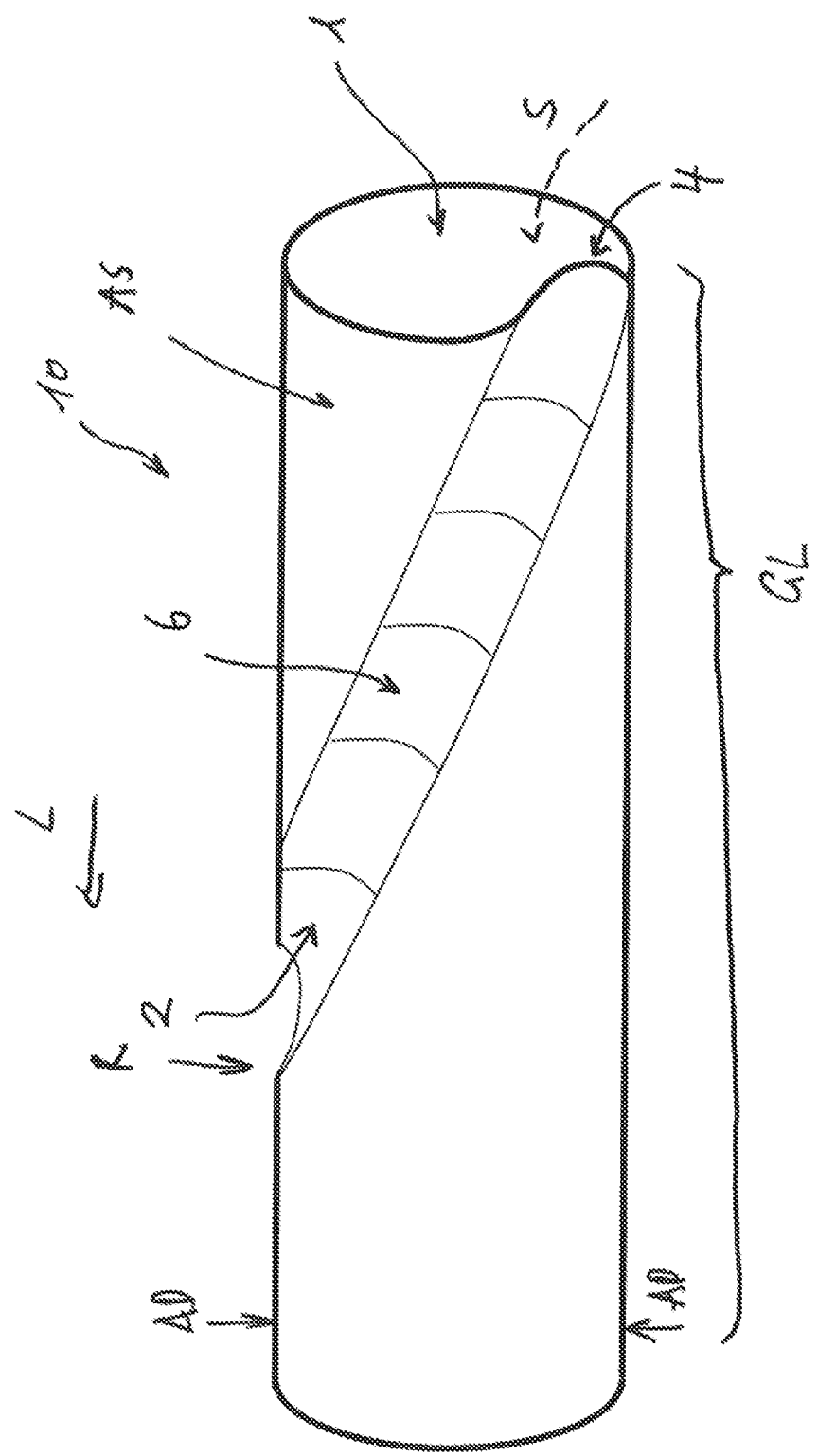

In this case, the vacuum cleaner hose 10 has a constant outside diameter AD. Apart from the continuous web 4, the inside diameter ID is furthermore constant over the total length GL of the vacuum cleaner hose 10. FIGS. 7 and 8 show a fourth preferred exemplary embodiment of the vacuum cleaner hose 10.

A flow guiding geometry 2, by means of which an occurring suction flow S can be influenced, is formed within the lumen 1. In this case, the flow guiding geometry 2 is formed by a continuous web 4, which extends in the form of a spiral over the total length GL of the vacuum cleaner hose 10.

In contrast to the exemplary embodiments in FIGS. 5 and 6, in which the channel 4 is welded to an inner surface of the vacuum cleaner 10, the channel 4 in the exemplary embodiment in FIGS. 7 and 8 is formed by an inwardly arched portion 6 of the hose outside AS, said portion being oriented into the hose interior. In other words, the vacuum cleaner hose 10 is arched or indented inward, starting from the hose outside AS, with the result that said flow guiding geometry 2 in the form of the continuous web 4 is formed within the lumen 1. The flow guiding geometry 2 adjoins the lumen 1. By means of a flow guiding geometry 2 designed in this way too, it is advantageously possible a longitudinal vortex form over the total length GL of the vacuum cleaner hose.

LIST OF REFERENCE SIGNS

1 Inner lumen
2 Flow guiding geometry
3, 3' Discrete profiled body
4 Web
6 Inwardly arched portion
10 Vacuum cleaner hose
100 Wet and dry vacuum cleaner
200 Suction system
AD Outside diameter
AS Hose outside
GL Total length
ID Inside diameter
L Longitudinal direction
R Radial direction
S Suction flow

What is claimed is:

1. A vacuum cleaner hose for connecting to a wet and dry vacuum cleaner, the vacuum cleaner hose comprising:
   an inner lumen extending in a longitudinal direction;
   a flow guiding geometry formed within the lumen or adjoining the lumen, the flow guiding geometry influencing a suction flow occurring during the operation of the wet and dry vacuum cleaner;
   wherein the flow guiding geometry has a continuous web.

2. The vacuum cleaner hose as recited in claim 1 wherein the flow guiding geometry extends inward in a radial direction.

3. The vacuum cleaner hose as recited in claim 1 wherein the flow guiding geometry extends or is distributed over a total length of the vacuum cleaner hose.

4. The vacuum cleaner hose as recited in claim 3 wherein flow guiding geometry extends or is distributed in the form of a spiral.

5. The vacuum cleaner hose as recited in claim 1 wherein the flow guiding geometry has a pyramidal or barrel-shaped cross section.

6. The vacuum cleaner hose as recited in claim 1 wherein the flow guiding geometry is welded to an inner surface of the vacuum cleaner hose.

7. The vacuum cleaner hose as recited in claim 1 wherein the flow guiding geometry is formed by an inwardly arched portion or indentation of the hose outside oriented into the hose interior.

8. The vacuum cleaner hose as recited in claim 1 wherein the vacuum cleaner hose is composed of plastic.

9. The vacuum cleaner hose as recited in claim 1 wherein the vacuum cleaner hose has a substantially constant outside diameter.

10. The vacuum cleaner hose as recited in claim 1 wherein is the vacuum cleaner hose is designed as a spiral hose.

11. A suction system comprising a wet and dry vacuum cleaner and a vacuum cleaner hose as recited in claim 1.

12. The vacuum cleaner hose as recited in claim 9 wherein the outer diameter is constant over an entire length of the vacuum cleaner hose.

13. The vacuum cleaner hose as recited in claim 9 wherein the continuous web has the barrel-shaped cross section.

* * * * *